United States Patent [19]

Gnade et al.

[11] Patent Number: 5,001,343

[45] Date of Patent: Mar. 19, 1991

[54] APPARATUS AND PROCESS FOR TESTING LEAKS IN PACKAGING FOR INTEGRATED CIRCUITS

[75] Inventors: Bruce E. Gnade, Rowlett; Joseph A. Keenan, Richardson, both of Tex.

[73] Assignee: Texas Instruments Incorporated, Dallas, Tex.

[21] Appl. No.: 560,502

[22] Filed: Jul. 24, 1990

Related U.S. Application Data

[63] Continuation of Ser. No. 373,422, Jun. 30, 1989, abandoned.

[51] Int. Cl.⁵ .............................................. G01T 1/161
[52] U.S. Cl. .................................................. 250/303
[58] Field of Search ......................................... 250/303

[56] References Cited

U.S. PATENT DOCUMENTS

| 90,331 | 2/1851 | Linder | 250/303 |
| 2,844,735 | 7/1958 | Creutz et al. | 250/303 |
| 3,135,865 | 6/1964 | Reed et al. | 250/303 |
| 3,179,806 | 4/1965 | Dixon et al. | 250/303 |
| 3,649,096 | 3/1972 | Clark et al. | 250/303 |

*Primary Examiner*—Bruce C. Anderson
*Attorney, Agent, or Firm*—James C. Kesterson; James T. Comfort; Melvin Sharp

[57] ABSTRACT

A process for testing leaks of a package (20) comprises the steps of introducing the package (20) into a chamber (30) and pressurizing the chamber (30) with a radioisotopic gas (14). After the package (20) has been removed from the chamber (30), a plurality of detectors (46) sense the gamma-ray emission from the individual packages (29). A conveyor system (44) can be employed to move the packages (20) during high volume production.

22 Claims, 1 Drawing Sheet

APPARATUS AND PROCESS FOR TESTING LEAKS IN PACKAGING FOR INTEGRATED CIRCUITS

This application is a continuation of application Ser. No. 07/373,422, filed June 30, 1989 abandoned.

TECHNICAL FIELD OF THE INVENTION

This invention relates in general to an apparatus and process for testing leaks in packaging for integrated circuits and in particular to an apparatus and process for testing leaks in packaging for integrated circuits using a radioisotopic gas as the testing fluid.

BACKGROUND OF THE INVENTION

The integrity of hermetic seals for integrated circuit packages is vital for high reliability integrated circuits such as those used by the military. Traditionally, quality control standards require that integrated circuit packages be 100% hermetically sealed. Over the past few decades, many tests have been developed for the purpose of proving the credibility of integrated circuits. Air-tight or hermetic packages for integrated circuits have been particularly useful, as it has been possible to test for hermetic seals. These hermetic testing procedures, however, are time consuming and require extensive governmental involvement to enforce the safety standards placed on the industry.

Additionally, the integrated circuit industry has not been completely successful in testing integrated circuits economically in high volume production. One previous testing method involved a leak test using radioactive krypton-85 gas. Helium has also been employed; however, krypton-85 has a higher detectibility than helium when used as the leak detection media. Despite this advantage of krypton-85 over helium, krypton-85 has a relatively low gamma-ray emission and thus is not a fully successful testing media.

Governmental regulation has required users to take extensive safety precautions when handling krypton-85, since krypton-85 has a radioactive half-life of approximately 10.8 years. Governmental agencies generally shut down testing facilities when krypton-85 is detected in the atmosphere, and thus prior radioactive gas testing has been quite expensive.

A need has therefore arisen for a hermetic testing apparatus and process for integrated circuits which is cost effective for high volume production, has the advantage of high gamma-ray emission for the detection of leaks, and is relatively safe to operate.

SUMMARY OF THE INVENTION

The present invention comprises an apparatus and process for testing leaks in packaging for integrated circuitry. The apparatus generally comprises a chamber for holding the packaging during processing. This chamber has a radioisotopic gas line connected to it. Gas is sent to the chamber for pressurizing it during processing. Additionally, a gas purging line is connected to the chamber for permitting inert gases to be brought into the chamber. For testing the gamma-ray emissions from the packaging, a detector is provided which can be contained either inside or outside of the chamber for determining the extent of leaks within the packaging.

The present process for testing leaks in a package comprises pressurizing a chamber with radioisotopic gas to surround the package. Subsequently, the chamber is purged with nitrogen gas for removing the radioisotopic gas from the chamber. The package is removed from the chamber and detectors are aligned along the package to determine the extent of gamma-ray emission from the package. In the preferred embodiment, radioisotopic gas is selected from the group comprising fluorine 18, oxygen 15, nitrogen 13, carbon 11 or a mixture thereof.

The present invention presents technical advantages over the conventional apparatus and process for testing leaks in packaging for integrated circuitry. The present invention has the ability to test for leaks in packaging at a relatively fast rate and has fewer safety problems than the prior art.

BRIEF DESCRIPTION OF THE DRAWINGS

Other aspects of the invention and their advantages will be discerned after studying the Detailed Description in conjunction with the drawings in which.

DETAILED DESCRIPTION OF THE INVENTION

Figure 1:
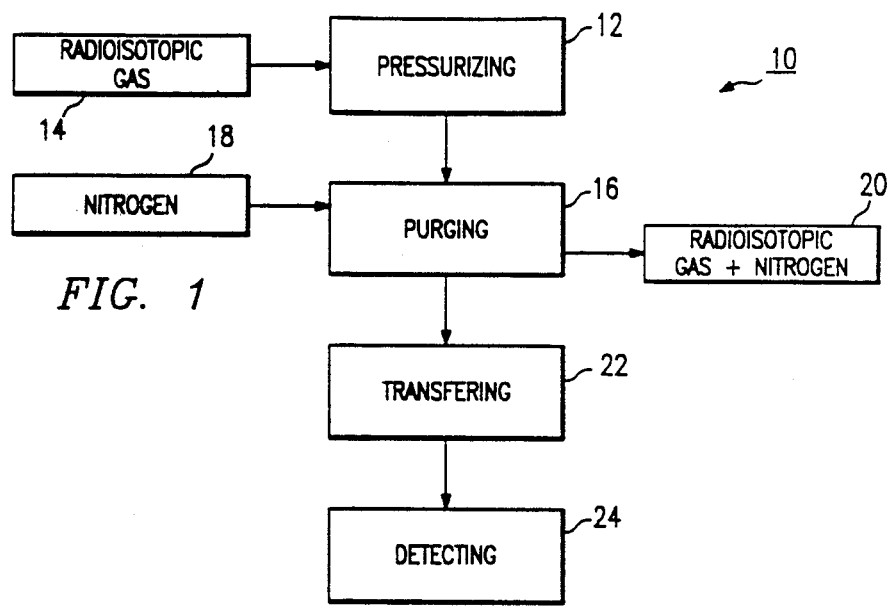
FIG. 1 is a block diagram of a process for testing leaks in packaging for integrated circuits according to the present invention.

Referring to FIG. 1, the present process for testing leaks in packaging for integrated circuits is shown in the block diagram and is generally designated 10. An integrated circuit package is introduced into a chamber and radioisotopic gas 14 is introduced into the chamber at pressurizing step 12 and surrounds the integrated circuit being tested. After pressurizing the chamber to the designated pressure, the chamber is subsequently purged in purging step 16.

Purging step 16 comprises the step of introducing a nitrogen gas 18 into the chamber and circulating the gas until the chamber no longer contains radioisotopic gas 14. Radioisotopic gas 14 and nitrogen 20 exit purging step 16 to create a radioisotopic gas and nitrogen gas mixture 20. After the chamber has been adequately purged of radioisotopic gas 14, the integrated circuit package is transferred from the chamber by a transferring step 22. Transferring step 22 may be a plurality of different mechanisms, such as a conveyor belt for large volume production.

After the integrated circuit package has been transferred from the chamber, the integrated circuit package is introduced to a detecting step 24. Detecting step 24 utilizes a single detector or a plurality of detectors surrounding the integrated circuit package. Detecting step 24 detects any gamma-ray emissions from the integrated circuit to determine the extent of leakage in the integrated circuit.

Figure 2:
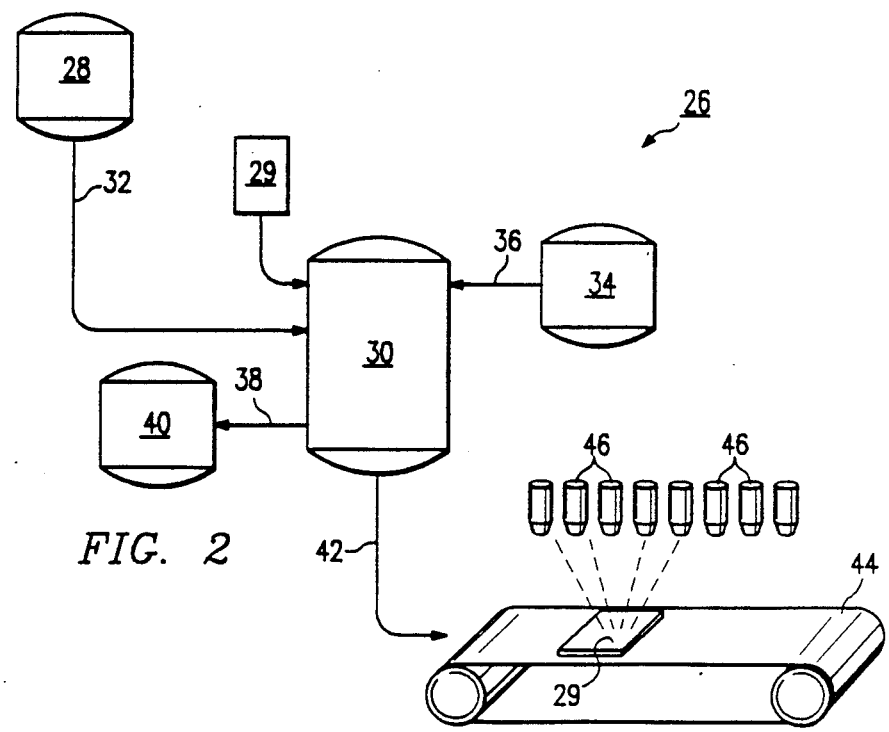
FIG. 2 is a schematic diagram of an exemplary apparatus suitable for testing leaks in packaging of integrated circuits.

Referring to FIG. 2, a schematic diagram of an exemplary apparatus 26 which detects the leaks within integrated circuits can be seen. Initially, a cyclotron 28 produces the radioisotopic gas. Cyclotron 28 is connected to a chamber 30 by a gas line 32.

A vessel 34 which contains a nitrogen gas, or another inert gas, is connected to chamber 30 by a gas line 36. Additionally, a receiving vessel 40 is connected to chamber 30 by a gas line 38. A transporting system 42 transports packages from chamber 30 to a conveyor system 44. A typical integrated circuit package 29 is shown on the conveyor system 44. Surrounding the conveyor system is a plurality of detectors 46.

In operation of the system, an integrated circuit package 29 is introduced into chamber 30 and the chamber 30 is hermetically sealed. Subsequently, cyclotron 28 transports a radioisotopic gas through line 32 to chamber 30. In its preferred embodiment, the radioisotopic gas produced in cyclotron 28 is selected from a group consisting of fluorine 18, oxygen 15, nitrogen 13, carbon 11 or a mixture thereof. The radioisotopic gas can have a labelling, or a carrying, compound for carrying the radioisotopic component of the system. For example, fluorine 18 may use methane or ethane gas as the carrier compound. After radioisotopic gas has been introduced into chamber 30, chamber 30 is pressurized to insure that adequate opportunity has been given for gas to incorporate into any leak which may exist in the integrated circuit package. After the chamber 30 has been pressurized, a nitrogen gas contained in vessel 34 is transported through line 36 into chamber 30 to purge chamber 30. The radioisotopic gas and nitrogen gas exit line 38 to a receiving vessel 40 which can subsequently be recycled for further processing or disposed of in a proper manner.

After vessel 30 has been adequately purged, integrated circuit package 29 is transported through transporting system 42 to conveyor belt 44. A plurality of integrated circuit packages 29 can be placed onto conveyor 44 for high volume production. As integrated circuit packages 29 pass along moving conveyor system 44, the detectors 46 monitor the extent of gamma-ray emission that may be emitting from integrated circuit packages 29. In an alternative embodiment, detectors 46 may be disposed within chamber 30. In this alternative embodiment, it is important that adequate purging be conducted through chamber 30 to insure that all radioisotopic gas leaves the system prior to detection operation.

As suggested earlier, gamma-ray detector 46 can be a single or a plurality of detectors. If a plurality of detectors 46 are aligned within an array, the location of a leak can be more adequately specified. Similar detectors have been previously used in the medical industry when using CAT scans to determine the radioisotopic emission from an individual. See M. N. Ter-Pogossian, M. E. Raichle, and B. E. Sobel, Positron-Emission Tomngraphy, Scientific American (October 1980).

With specific reference to the cyclotron 28, positron emitting isotopes are created by bombarding non-radioactive elements with particles such as protons, deuterons or helium nuclei. For example, carbon 11 is produced when boron 10, whose nucleus consists of five neutrons and five protons, captures another proton. Carbon 11 can be combined with oxygen to form carbon 11-carbon dioxide.

As previously noted, Krypton-85 has been heretofore used widely in the industry. The use of krypton-85 in integrated circuit testing has been described in an article published by G. Neff and J. Neff, Microelectronic Manufacturing in Testing, (September 1986). The most sensitive leak rate determination to date using krypton-85 is $1 \times 10^{-11}$ atoms centimeters cubed per second (atoms cm$^3$/sec.) This number is near the theoretical limit of obtainable sensitivity using krypton-85. The sensitivity limit of krypton-85 is substantially worse than the sensitivity limit for the radioisotopic gases used in the present invention.

Another disadvantage of using krypton-85 is its radioactive half-life of approximately 10.8 years. This radioactive material requires elaborate handling and storage capacities. As radiation safety laws become more stringent this disadvantage is exacerbated. The present invention replaces krypton-85 with a short lived, carrier-free, positron emitting radioisotope such as fluorine 18, oxygen 15, carbon 11 and nitrogen 13.

The production of radioisotopes requires the onsite availability of a cyclotron because of the short life of the radioisotopes. The half-lives of the radioisotopes in question are approximately 10 minutes for nitrogen 13, approximately 20 minutes for carbon 11, approximately 2 minutes for oxygen 15, and approximately 2 hours for fluorine 18. Despite these short half-lives, it is possible to utilize these radioisotope gases for longer periods of time during testing. For example, nitrogen 13, which has a reported half-life of approximately 10 minutes, can be utilized for as much as 2 hours for testing purposes. With the 10 minute half-life, the reduction of the emission of gamma-rays is apparent when being used for a 2 hour period. However, due to the high concentration of gamma-rays, there is still a detectable amount of gamma-rays after several hours.

The radioisotopes as described in the present invention have a higher output of gamma-rays than krypton-85. Therefore, these gases have a higher degree of sensitivity during testing.

Nuclear disintegration, or decay, is a statistical event. With a large enough sample, however, the observed decay rate approximates to a simple first-order rate process as expressed below.

$$D = -\frac{dN}{dT} = \lambda N$$

where D is the disintegration rate, T is time N is the number of atoms present, and $\lambda$ is the decay constant.

In the cited Microelectronic Manufacturing and Testing article disclosed above, it was found the krypton-85 atoms can be detected at approximately $1 \times 10^{11}$ atoms. This indicates a gamma-ray sensitivity of approximately 0.9 gammas per second or a Detection Limit of 0.9 gammas per second when using the relationship disclosed above.

In contrast, the calculations for fluorine 18 can be illustrated. Specifically, by replacing the factors for the above equation, $$^{18}F = 0.9 \text{ gammas/sec}$$
$$= X \text{ dis./sec.} \times 2.0 \text{ gammas/dis.}$$

$= X$ dis./sec.$\times 2.0$ gammas/dis.

By inserting these factors into the equation $A = N \times \lambda$, where $\lambda = \ln/t_{\frac{1}{2}}$ $$\lambda = 1.05 \times 10^{-4} \text{ sec}^{-1}$$

Accordingly, $$N = 4.3 \times 10^3 \text{ atoms}$$

N indicates that when the Detection Limit is 0.9 gamma-rays/sec., only $4.3 \times 10^3$ atoms must be emitted for fluorine 18 as compared to $1 \times 10^{11}$ atoms for krypton-85. Consequently, the gamma-ray sensitivity can be improved by the present invention by approximately $2\times 10^7$ with the same detection limit of 0.9 gammas per second.

Like fluorine 18, oxygen 15, carbon 11 and nitrogen 13 have increased sensitivity for detection of gamma-ray emission. Consequently, calculations have indicated a similar increase in selectivity for these compounds.

In summary, the advantageous leak detecting system disclosed features the use of a short-lived carrier-free positron emitting gas in place of krypton-85 gas. Radioisotopic gases used in the present invention have a radioactive half-life of only a few hours as compared to 10.8 years for kryton-85 gas. Additionally, when utilizing the present invention, the sensitivity can be increased by approximately $2\times 10^7$ when employing fluorine 18 as compared to krypton-85.

While the preferred embodiment of the present invention and their advantages have been disclosed in the above-detailed description, the invention is not limited thereto but only by the spirit and scope of the appended claims.

What is claimed is:

1. A process for testing for leaks in packaging, comprising the steps of:
    (a) providing a chamber having packaging under test therein at substantially ambient pressure;
    (b) pressurizing said chamber with a radioisotopic gas to a pressure above said ambient pressure to surround the package with said radioisotopic gas under pressure and cause some of said radioisotopic gas to penetrate into said package;
    (c) depressurizing said chamber to said ambient pressure;
    (d) removing said packaging from the environment of said radioisotopic gas; and
    (e) detecting the radiation around the package to determine leaks in the package.

2. The process of claim 1, further comprising the steps of purging the chamber with an inert gas and then removing the packaging from the chamber.

3. The process of claim 1, wherein said detecting of the radiation is accomplished by surrounding the package with a plurality of gamma ray detectors for locating the position of the leak.

4. The process of claim 1, wherein said radioisotopic gas has a carrier compound for transporting the radioisotopic gas.

5. The process of claim 4, wherein said gas comprises fluorine and said carrier for fluorine comprises methane.

6. A process for testing leads in packaging held in a chamber, comprising the steps of:
    (a) pressurizing the chamber with a radioisotopic gas to surround the package with the radioisotopic gas; and
    (b) detecting the radiation around the package to determine leaks in the package;
    (c) wherein said radioisotopic gas is selected from a group consisting of fluorine 18, oxygen 15, nitrogen 13, carbon 11 and mixtures thereof.

7. The process of claim 6, wherein said radioisotopic gas has a carrier compound for transporting the radioisotopic gas.

8. A process for testing leaks of a package, comprising the steps of:
    (a) providing a chamber having a package under test therein at substantially ambient pressure;
    (b) pressurizing the chamber with a radioisotopic gas to a pressure above said ambient pressure;
    (c) purging the chamber with an inert gas to remove the radioisotopic gas from the chamber; and
    (d) detecting radiation from the package.

9. The process of claim 8, further comprising the step of detecting the radiation from the package by surrounding the package with a plurality of gamma ray detectors.

10. The process of claim 8, wherein said detecting step measures the level of gamma-ray emission from the package.

11. A process of claim 7, wherein said radioisotopic gas has a carrier compound.

12. The process of claim 11, wherein said gas comprises fluorine and said carrier compound for the fluorine radioisotopic gas comprises methane.

13. A process for testing leaks of a package contained in a chamber, comprising the steps of:
    pressurizing the chamber with a radioisotopic gas;
    purging the chamber with an inert gas to remove ;the radioisotopic gas from the chamber; and
    detecting radiation from the package;
    wherein said radioisotopic gas is selected from a group consisting of fluorine 18, oxygen 15, nitrogen 13, carbon 11 and a mixture thereof.

14. The process of claim 13 wherein said radioisotopic gas has a carrier compound for transporting the radioisotopic gas.

15. An apparatus for testing for leaks in packaging containing integrated circuits, which comprises:
    (a) a chamber for holding the packaging;
    (b) a radioisotopic gas source connected to said chamber for pressurizing said chamber with radioisotopic gas to a pressure above ambient pressure;
    (c) a purging system for purging the chamber with an inert gas; and
    (d) a detector for detecting gamma-ray emission from the packaging to detect leaks therein.

16. The apparatus of claim 15, wherein said purging system uses an inert gas for purging said chamber.

17. The apparatus of claim 15 wherein said detector comprises a plurality of gamma ray detection devices for surrounding the package to determine the location of the leak.

18. The apparatus of claim 15, wherein said detector is located within said chamber.

19. The apparatus of claim 15, wherein said detector is located outside said chamber.

20. An apparatus for testing leaks in packaging containing integrated circuits, which comprises:
    (a) a chamber for holding the packaging;
    (b) a radioisotopic gas source connected to said chamber for pressurizing said chamber with radioisotopic gas;
    (c) a purging system for purging the chamber with an inert gas; and
    (d) a detector for detecting gamma-ray emission from the packaging to detect leaks therein;
    wherein said radioisotopic gas is selected from a group consisting of fluorine 18, oxygen 15, nitrogen 13, carbon 11 and a mixture thereof.

21. An apparatus for detecting leaks in integrated circuit packages, which comprises:
    (a) a chamber for holding an integrated package;
    (b) a radioisotopic gas inlet line for pressurizing said chamber with a radioisotopic gas to a pressure above ambient pressure;
    (c) a purging line for purging said chamber with an inert gas;

(d) an outlet line for removing said radioisotopic gas and said inert gas from said chamber; and (e) a detector surrounding the integrated circuit package for detecting the gamma-ray emission from the integrated circuit package and to locate the area of the leak by determining the level of gamma-ray emissions from the integrated circuit package.

22. An apparatus for detecting leaks in integrated circuit packages, which comprises:

(a) a chamber for holding an integrated package;

(b) a radioisotopic gas inlet line for pressurizing said chamber with a radioisotopic gas;

(c) a purging line for purging said chamber with an inert gas;

(d) an outlet line for removing said radioisotopic gas and said inert gas from said chamber; and (e) a detector for detecting surrounding the integrated circuit package for detecting the gamma-ray emission from the integrated circuit package and to locate the area of the leak by determining the level of gamma-ray emissions from the integrated circuit package;

(f) wherein said radioisotopic gas is selected from a group consisting of fluorine 18, oxygen 15, nitrogen 13, carbon 11 and a mixture thereof.

* * * * *